(12) United States Patent
Mar et al.

(10) Patent No.: US 6,901,592 B2
(45) Date of Patent: May 31, 2005

(54) METHOD AND APPARATUS FOR THE ENUMERATION OF SETS OF CONCURRENTLY SCHEDULED EVENTS

(75) Inventors: Aaron Mar, Vancouver (CA); Ronald Westfall, North Vancouver (CA); Gary Robinson, Port Coquitlam (CA)

(73) Assignee: Redback Networks, Inc., San Jose, CA (US)

( * ) Notice: Subject to any disclaimer, the term of this patent is extended or adjusted under 35 U.S.C. 154(b) by 563 days.

(21) Appl. No.: 09/995,285

(22) Filed: Nov. 27, 2001

(65) Prior Publication Data

US 2002/0078236 A1 Jun. 20, 2002

(30) Foreign Application Priority Data

Nov. 27, 2000 (CA) .............................................. 2327001

(51) Int. Cl.[7] .................................................. G06F 9/00
(52) U.S. Cl. ........................ 718/102; 719/318; 370/232
(58) Field of Search ........................ 718/102; 719/318; 370/232; 709/223–224

(56) References Cited

U.S. PATENT DOCUMENTS

| | | | |
|---|---|---|---|
| 5,515,363 A | * | 5/1996 | Ben-Nun et al. ........... 370/232 |
| 5,640,389 A | * | 6/1997 | Masaki et al. .............. 370/418 |
| 6,047,322 A | | 4/2000 | Vaid et al. |
| 6,134,217 A | | 10/2000 | Stiliadis et al. |

FOREIGN PATENT DOCUMENTS

| WO | WO 98/26510 | 6/1998 |
|---|---|---|
| WO | WO 00/11885 | 3/2000 |

OTHER PUBLICATIONS

Internetworking Technologies Handbook, Ch. 49, "Quality of Service Networking," pp. 49.1 to 49.32.

* cited by examiner

*Primary Examiner*—Meng-Al T. An
*Assistant Examiner*—Phuong N. Hoang
(74) *Attorney, Agent, or Firm*—Blakely, Sokoloff, Taylor & Zafman LLP

(57) ABSTRACT

A method for enumerating sets of concurrent events handles single-shot events and recurring events. The method involves creating a data structure having records for time periods. The time periods begin and end on overall start and end times of scheduled events. In preferred embodiments the method creates the data structure by collapsing together master schedules for a plurality of resources. The method may create the master schedules by collapsing together mini-schedules of different priorities. The method can produce a minimal list of sets of concurrent events that will occur according to a universal master schedule in a form suitable for processing by an automatic validation system.

23 Claims, 5 Drawing Sheets

METHOD AND APPARATUS FOR THE ENUMERATION OF SETS OF CONCURRENTLY SCHEDULED EVENTS

CROSS REFERENCE TO RELATED APPLICATIONS

This application claims the benefit of the filing date of Canadian patent application No. 2,327,001 entitled POLICY SCHEDULE VERIFICATION METHOD AND APPARATUS and filed on Nov. 27, 2000.

1. Field of the Invention

This invention relates to automated scheduling systems. In particular, the invention relates to methods and apparatus for identifying sets of concurrent events in systems of schedules. The invention has application in the field of scheduling generally and has particular application in the field of data communication networks. The invention may be applied in scheduling Quality of Service (QoS) policies for packet handling devices in communications networks. The invention may be applied more generally to identify sets of events which a system of schedules cause to overlap with one another.

2. Background of the Invention

Many fields of endeavour require that series of events be scheduled. An event could be an educational course, a work task, a television or radio program, or any other thing that should occur at a time or during a time period. There may be multiple schedules in effect concurrently. For example a separate schedule may exist for: each lecture room in a university, each work party in a construction crew, or each television channel in a viewing area. Schedules can be complex. This is especially the case if regularly scheduled events can be preempted by special events. For example, in the field of data communications, a QoS policy might be scheduled for activation during specified intervals. Each router or packet forwarding device in a data communications network, or even each interface to a data link within such a device, might have its own set of QoS policies which are activated according to a schedule unique to the device or interface.

Each schedule is generally associated with a resource whose use is controlled by the schedule. For example, the resource might be a television channel, a work crew, or a lecture hall.

Each schedule governs the use of its associated resource. The sequence of television programs that can be watched on a television channel is governed by a schedule. The lectures that can be attended in a lecture hall are governed by a schedule.

Schedules may interdepend—that is, in certain cases an event on one schedule must not be scheduled concurrently with an event on another schedule. For example, consider multiple work crews, each with its own schedule of work tasks. Certain work tasks might require a certain type of equipment that is in limited supply. If there are M items of this type of equipment, only M work crews can perform concurrently work tasks that require this type of equipment. Similarly consider a university that has multiple lecture schedules, one for each lecture room. It would be inappropriate to schedule two lectures at overlapping times where a significant number of students are signed up to attend both lectures.

Scheduling conflicts may cause a system to malfunction. It is desirable to validate schedules in advance to identify conflicts between scheduled events. While detecting schedule conflicts is trivial where schedules are very simple, detecting conflicts between schedules in a complex system having a large number of schedules which interdepend in various ways is far from trivial. There is currently no satisfactory system for identifying scheduling conflicts in complicated systems.

In the university lecture scheduling example given above, validation might include checking to see if there are two or more lectures where the number of double or triple booked students exceeds some threshold value. For example, the university may check to see how many students are booked for more than one lecture at 2:30 p.m. on Sep. 20, 2000. In this example, it is not only necessary to validate the set of lectures being held at 2:30 PM, but also those being held at any time on Sep. 20, 2000 which could overlap with any part of the 2:30 p.m. lecture. For the university to validate all of its class schedules, it must perform validation not only for each lecture period on Sep. 20, 2000, but also for every other day of the school term. A first problem that needs to be solved before validation can be performed is to identify all sets of events that a schedule requires to occur concurrently. All such sets of concurrent events from the earliest to the latest date and time in any of the schedules in the group must be enumerated. This invention relates to the efficient enumeration of all sets of concurrent events given a group of schedules.

On the surface this does not seem to be a difficult problem. All scheduled events can be sorted by their scheduled start date and time. Starting at the earliest start date and time and proceeding to the latest end date and time, the sorted events can be analyzed to identify and enumerate the sets of concurrent events.

Enumerating sets of concurrent events is often complicated in practice. An enumeration system which mistakenly reports that a conflicting combination of events occurs in a schedule will result in the validation system incorrectly concluding that there is a conflict in the schedule. Therefore, the enumeration system must be accurate. Further, schedules themselves can be complex. First of all, the events in a schedule may be classified into at least three different types as follows:

single-shot events that occur once, starting at a specified date and time and ending at another specified date and time (e.g. a television special);

recurring events that occur on a specified periodic basis between an overall start date and time and an overall end date and time (e.g. a mini-series starting May 1 and running through Jun. 30 that occurs every Monday and Tuesday night between 8:00 and 9:00 PM); and, recurring events that occur on a specified periodic basis between an overall start date and time and an overall end date and time (e.g. a meeting that takes place in a lecture room on the 1st and the 15th of each month between 7:00 and 10:00 PM).

For either type of recurring event the overall end date and time may not be known until the event is actually terminated (e.g. a Rotary club meeting may occur on the third Tuesday of each month until the Rotary club ceases operations).

Secondly, one event can preempt another. For example, regular television network programming may be preempted by coverage of the Academy Awards ceremony. A library in a school might have a schedule for its use as a library which applies except when preempted occasionally for the writing of exams.

Identifying all sets of concurrent events by sorting all events by their scheduled start date and time will not work because some events may not have a specified end date and time. Unless the searching algorithm is designed carefully, there is a chance of ending up in an infinite loop. Recurring events introduce a serious problem. Within their overall schedules, recurring events have a periodic or aperiodic pattern of occurrence. If the overall end dates and times are not specified, this pattern repeats itself indefinitely.

Consider three trivial schedules. Each schedule has just one recurring event in it. The overall schedule of each recurring event is from Jan. 1, 2000 until the indefinite future. Suppose the pattern of the three recurring events was that shown below:

Event "A"—from 10:00 AM to 12:00 PM every Monday, Wednesday, and Friday

Event "B"—from 9:30 AM to 10:30 AM on the 1st and 15th of each month

Event "C"—from 10:30 AM to 11:30 AM every other day

Which sets of concurrent events should be validated? Coincidences between the first and third recurring events are fairly easy to figure out (the coincidences repeat every two weeks). The second event is problematic, since there may be a large number of points in the future where the 1st or 15th of each month happens to fall on a Monday, Wednesday, Friday, and/or "every other day".

Many real life situations involve a large number of concurrent schedules. For example, a university may have several hundred lecture rooms. In certain data network scenarios, there may be as many as a million routers or packet handling devices, each with several interfaces. Even if each schedule has relatively few events, analysis of the schedules to enumerate the sets of concurrent events may be extremely difficult. A brute force, time-based enumeration of events may easily degenerate into an infinite loop that never terminates.

Another problem that needs to be solved is to enumerate the minimum set of unique sets of concurrent events that require validating. Validating each set of concurrent events may be very computationally expensive. This is certainly true of QoS policy validation. In addition there may be time constraints on how long it takes to perform validation. It is often desirable to perform validation while a user is waiting for a response so that the user can interactively adjust a schedule.

To be efficient a validation process should not waste time validating sets of concurrent events that have been previously validated. If one considers the above three schedules with their simple recurring events, it should be obvious that the same sets of concurrent events will repeat themselves. As a trivial example of this, consider two concurrent recurring events:

from 10:00 AM to 12:00 PM every Monday, Wednesday, and Friday from 10:30 AM to 11:30 AM every other day Assume that the overall schedule for these two recurring events is fixed to start on Jan. 1, 2000 and end on Dec. 31, 2000. During the year this schedule is in operation, the first recurring event occurs approximately 52×3=156 times and the second recurring event occurs approximately 365/2=182 times. Iterating through the year checking the set of events whenever one of these events occurs would waste computational resources. It would require validation of approximately 338 sets of events. There is no commonality between the 156 events and the 182 events, because they start at 10:00 AM and 10:30 AM respectively.

The inventors have identified a solution to this problem which identifies the 4 unique sets of concurrent events: neither event in progress, only the first event is in progress, only the second event is in progress, and both events in progress. This results in an 80-fold reduction in validation effort.

The fact that, in this example, there are only four unique combinations of the two recurring events suggests another simple method for solving the problem. Instead of performing brute force, time-based enumeration of events, one can calculate all of the possible combinations of events and evaluate all of them. Unfortunately there are two problems with this supposedly simple method. First, the number of possible unique combinations can be quite large. If N resources each have a schedule containing one recurring event, there can be as many as $2^N$ combinations of these events being in progress or not in progress if the timing of the events is being ignored. It does not take very many resources before it becomes impractical to validate the possible combinations. As an example of how impractical such an approach can be, consider the following. In a packet handling device developed by the inventors, there can be more than 256 output interfaces that are controlled by QoS policies. Each interface has its own schedule of QoS policies to activate. The above approach would require that more than $2^{256}$ combinations of QoS policies be identified and evaluated. There is not and never will be enough disk storage to even list the possible combinations, much less validate them. In practice, very few of the $2^{256}$ combinations would ever really occur. Most of the interfaces just have a default QoS policy that is scheduled to be always active.

A method for enumerating sets of concurrent events should be able to deal with schedules made up of sub schedules. A resource might be controlled by a single master schedule. The master schedule could detail all events including multiple levels of preempting events. Typically, however, a master schedule is constructed from multiple partial schedules. For example, FIG. 3 indicates that a television station might develop its schedule of regular programs for the fall season 200 sometime in the summer. The network, of which the television station is an affiliate, might largely determine this schedule. Overlaid on this schedule will be a specialized schedule 201 for major events such as the Olympics. Schedule 201 preempts schedule 200. One can imagine that when the Olympics were held in Atlanta, Ga. several years ago, the schedule of Olympic event and news coverage was unique for the Atlanta affiliate. Overlaid on top of these schedules is yet another schedule 202 pulled together at the last moment to handle breaking news events (e.g. the interviews and coverage immediately following an airplane crash).

Operational efficiencies can be achieved by constructing a master schedule from simpler schedules. For example, the individuals constructing a detailed schedule of coverage of Olympic events probably do not want to worry about the interaction of this detailed schedule with the coarser-grained schedule of regular programs. Instead, periods of time would be blocked off in the regular schedule for Olympic coverage. The individuals planning the detailed Olympic schedule can then construct a more detailed schedule within the allotted periods of time.

When a master schedule is constructed from multiple simpler schedules, each schedule can be assigned a priority. A higher priority schedule interrupts or preempts a lower priority schedule.

In summary, the usage of a set of N resources might be governed by N master schedules, one per resource. Each master schedule might be an amalgamation of multiple simpler mini-schedules. Each of the mini-schedules has a priority that determines which mini-schedule is currently in effect. Each mini-schedule contains a variety of single-shot and recurring events that may or may not have a termination date and time specified.

It should be obvious that identifying a minimum set of unique sets of concurrent events to be validated is non-trivial in many practical situations. There is a need for some method for enumerating sets of concurrent events from schedules for N resources. Preferably the method should accommodate each resource having a master schedule comprising multiple mini-schedules each with a preemption priority. The method should preferably generate a set having the minimum number of unique sets of concurrent events.

SUMMARY OF THE INVENTION

Various aspects of the invention provide methods, data structures, apparatus and computer program products which relate to the identification of sets of concurrent events. One aspect of the invention provides a computer-implemented method for enumerating sets of concurrently scheduled events for automatic validation. The method comprises, in a programmed computer system:
a) providing a universal master schedule comprising a plurality of time period data records (TPDRs) each having a start time and an end time, at least some of the TPDRs comprising references to events, each event having an overall start time and an overall end time, the events including recurring events each having a period;
b) retrieving a TPDR from the universal master schedule;
c) establishing a time limit for the TPDR;
d) performing a time-based iteration to identify sets of concurrent events by:
  1) establishing the start time of the TPDR as a selected time;
  2) identifying a set of zero or more events occurring at the selected time;
  3) creating a record of the set of zero or more events occurring at the selected time;
  4) identifying a new selected time corresponding to a next time when an event referenced by the TPDR could start or stop; and,
  5) repeating actions (2) to (4) until the new selected time is in excess of the time limit; and,
e) performing actions (b) through (d) for each TPDR in the universal master schedule.

Another aspect of the invention provides a universal master schedule data structure for use in a computerized system for enumerating sets of concurrent events between a dawn of time and an end of time. The universal master schedule data structure comprises a plurality of time period data records (TPDRs), each comprising a start time of a corresponding time period; an end time of a corresponding time period; and, references to zero or more events capable of occurring within the time period, the events having overall start times and overall end times. The time periods of the time period data records are non-overlapping and continuous between the dawn of time and the end of time. All of the overall start times and all of the overall end times correspond to the dawn of time, the end of time or one of the start times.

A further aspect of the invention provides apparatus for enumerating sets of concurrently scheduled events. The apparatus comprises: a first means for collapsing a plurality of mini-schedules into a master schedule; a second means for collapsing a plurality of master schedules into a universal master schedule, the second means connected to receive a plurality of master schedules generated by the first means; and, a third means for extracting a plurality of sets of concurrent events, the third means connected to receive a universal master schedule from the second means and to store a data record containing information identifying sets of concurrent events scheduled in the universal master schedule.

Further details, features and advantages of the invention are described below.

BRIEF DESCRIPTION OF THE DRAWINGS

In drawings used to explain non-limiting embodiments of this invention.

DETAILED DESCRIPTION

A currently preferred embodiment of the invention will now be described. The following description is of a specific embodiment of the invention applied to the validation of Quality of Service ("QoS") policies in a data communication network. The invention may also be applied to the validation of other schedules.

A data communication network comprises a number of interconnected data packet handling devices. The packet handling devices typically include routers and may also include other devices such as switches, bridges, gateways, firewall devices, and so on. The QoS policies control the QoS (e.g. bandwidth, delay, jitter, etc.) that is enforced by routers and other packet forwarding devices. QoS policies can be scheduled for activation in various parts of a network at various dates and times. Packets passing through the network must experience a consistent set of QoS policies in order to be provided appropriate treatment. This invention may be used to enumerate all of the sets of QoS policies that may be concurrently active. Each set can then be validated for consistency.

A data communication network typically has a default QoS policy that is active with an unspecified termination date and time. This QoS policy might be interrupted by a QoS policy with a recurring schedule that specifies the QoS for an enterprise during its normal weekday working hours. Either of these QoS policies might be interrupted by a single-shot QoS policy that specifies the QoS for a specific event (e.g. a one-time video conference call).

Figure 1:
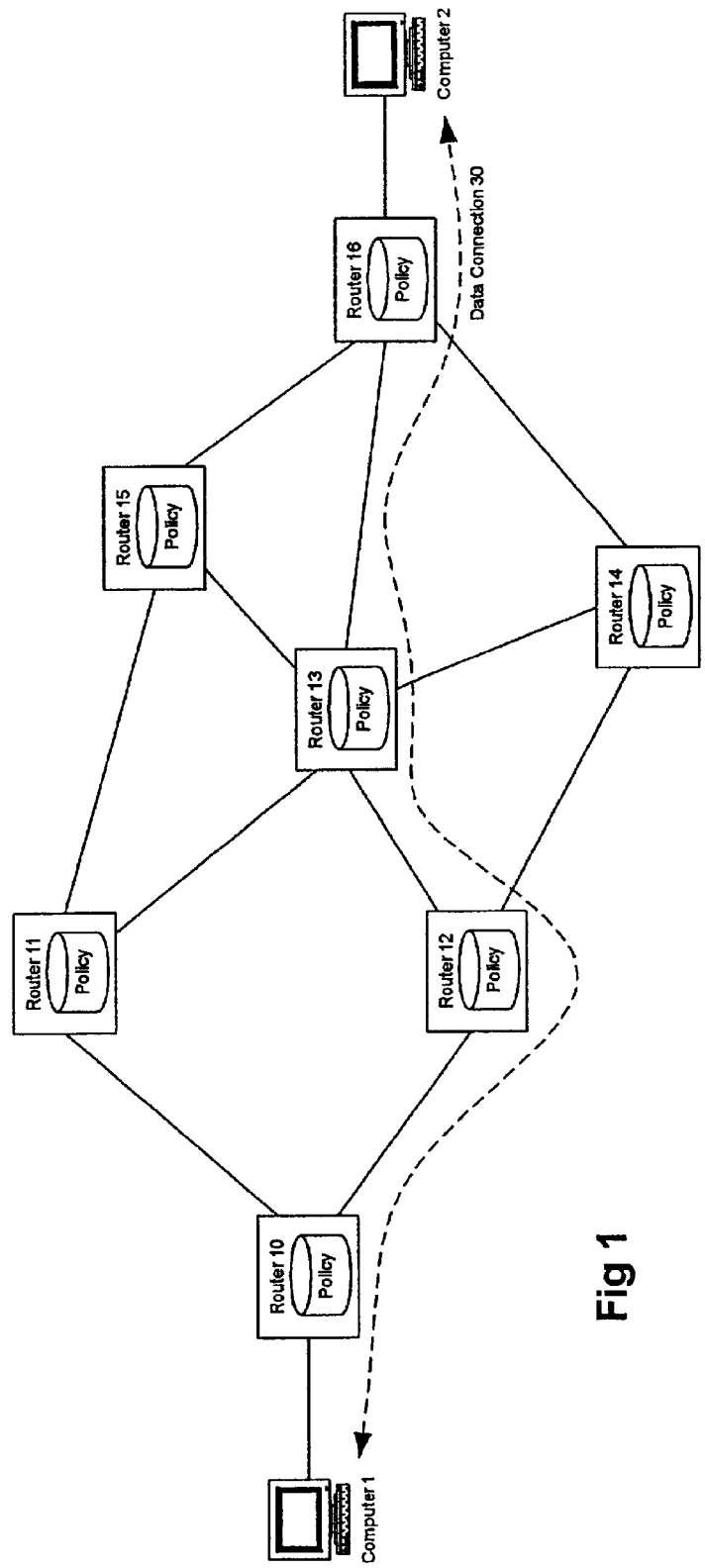
FIG. 1 is a schematic network diagram showing a network having a number of devices on which QoS policies may be deployed according to various schedules.
Figure 2:
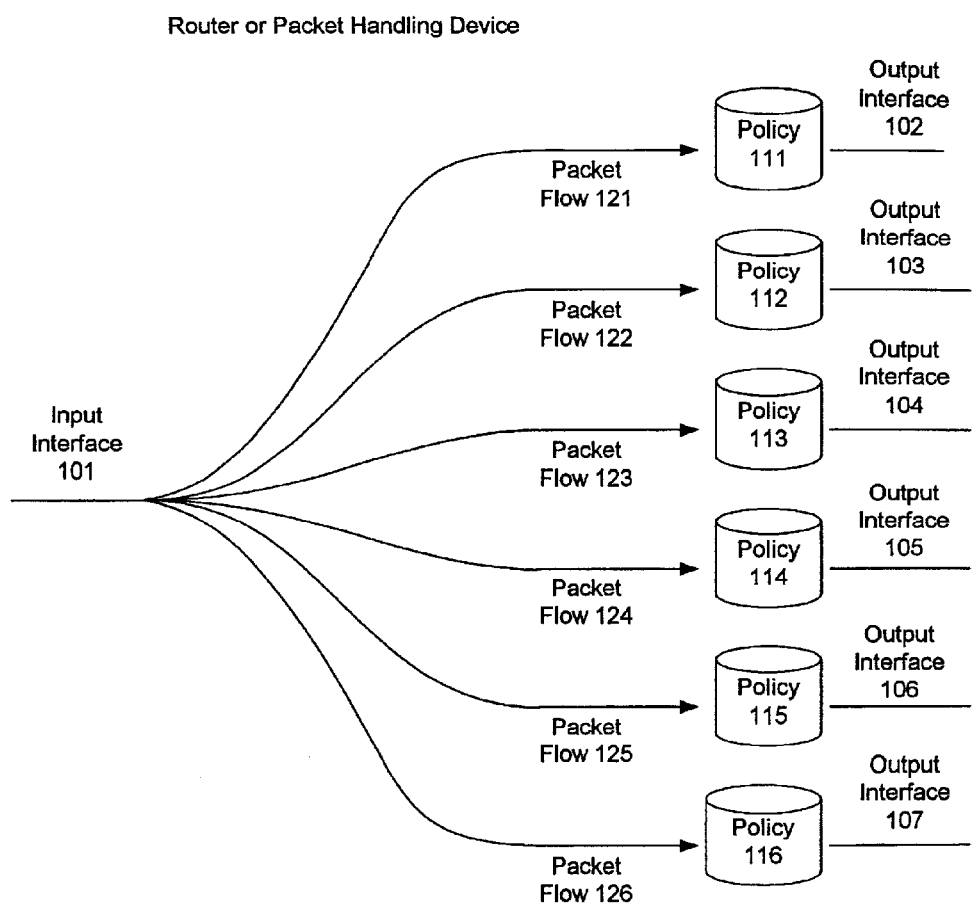
FIG. 2 is a block diagram of a single router having a plurality of interfaces each having a QoS policy schedule.
Figure 3:
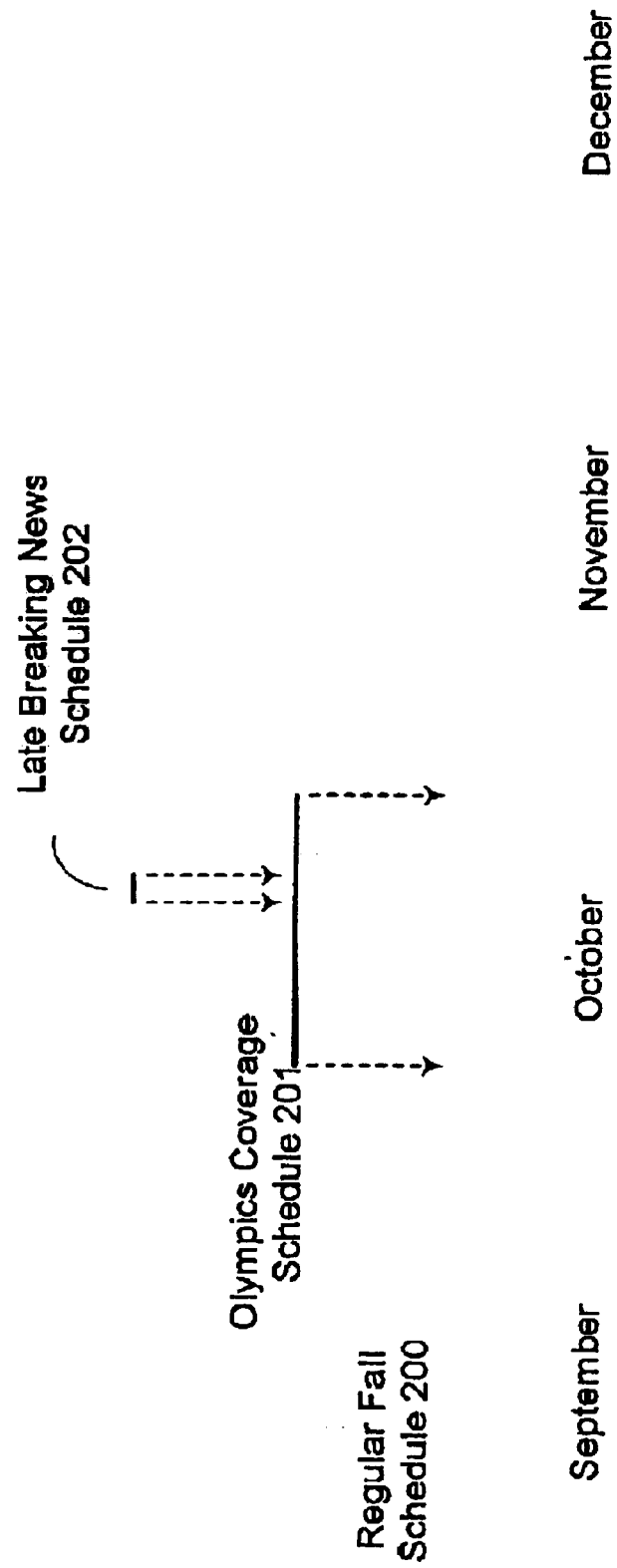
FIG. 3 illustrates the preemption of a low priority schedule by a higher-priority schedule.

A data communication network has a large number of resources for which schedules may exist. These resources might include central packet forwarding processors in packet handling devices such as routers. The schedule controls when QoS policies are applied to packets transiting through the device. For example, FIG. 1 shows several routers 10–16 whose central packet forwarding processors are controlled by scheduled QoS policies. In some cases. The resource may be the limited bandwidth of a data link leaving the packet handling device. In such cases the interface might have its own schedule of QoS policies for prioritizing access to the bandwidth resource. For example, FIG. 2 shows a router or packet handling device where the packet flows 121–126 being forwarded out of output interfaces 102–107 are controlled by QoS policies 111–116. The packets originate at input interface 101. The QoS policy enforced by the central packet forwarding processor or for each interface in a router or packet handling device is governed by a schedule.

In a packet handling device, a master schedule might be constructed from several simpler schedules. At the lowest level there is a simple schedule of default QoS policies that specify default treatment of packets when no other policies are active. Layered on top of this, for example, is a slowly evolving schedule of QoS policies to handle long duration data services that are subscribed to well in advance. Layered on top of this is a quickly evolving schedule of QoS policies to handle one-time, short duration data services that are subscribed to on a dynamic basis, perhaps just before the service is used.

In a packet handling device, QoS policies contain classification rules which select a subset of the packets passing through the device in order to specify the QoS treatment that those packets are to receive. For example, a QoS policy might specify that all TCP packets destined to TCP port 80 at the IP address 208.216.181.15 should take advantage of a reserved pool of 1 Mbps of bandwidth. It so hapens that this policy would match all web browsing traffic (TCP port 80) destined for the web site (208.216.181.15).

A conflict occurs if another QoS policy in the same packet handling device specifies that this same traffic must compete for whatever bandwidth is available. For example, in FIG. 2 QoS policy 112 might contain the above rules specifying that web traffic boundd for the web site (208.216.181.15) should take advantage of 1 Mbps of bandwidth that is reserved for such traffic on output interface 103. The QoS policy 114 might also contain rules matching the web browsing traffic bound for the web site(208.216.181.15), but QoS policy 114 might specify that this traffic should just compete with other traffic for access to the bandwidth of output interface 105. If both of policies 112 and 114 were in effect simultaneously then a conflict would occur since the router or packet handling device would not know which of the two policies to enforce. Even if the two mismatching policies are in separate routers or packet handling devices and one device is upstream of the other, there may not be a direct conflict, but packets will not be consistently provided with the appropriate QoS treatment.

In a complex set of N master schedules, each schedule consisting of prioritized preempting mini-schedules, there will be many different sets of concurrent events that must be validated. Validation is used to detect concurrently scheduled events that are incompatible. A validation method is fed a set of concurrent events. The set of events is analyzed to detect events that are incompatible. For example, the co-pending commonly owned Canadian patent application entitled POLICY VERIFICATION METHODS AND APPARATUS filed on Nov. 27, 2000 describes a policy validation method that can detect conflicts in a set of QoS policies that are scheduled to be active simultaneously.

The method begins by obtaining a schedule for each of N resources. In a preferred embodiment of the invention, each schedule comprises one or more mini-schedules. The mini-schedules each have a priority. Higher-priority mini-schedules preempt lower priority mini-schedules. Each mini-schedule schedules zero or more events. The events may be one-shot events or recurring events.

The method of the invention requires the ability to designate when events start and end. In a preferred embodiment of the invention each event has a starting date and time and an ending date and time. In the following discussion, "time" means a date and time. The time may be represented in any format which uniquely specifies a time within a suitable range. In addition to absolute times (e.g. Feb. 7, 2000 8:05 PM), two special values are used:

Dawn of Time ("DOT") and,

End of Time ("EOT").

Dawn of Time represents a time that precedes any other specified start or end time. End of Time represents a time indefinitely in the future. Events with no specific end time can be assigned EOT as their end times.

Each single-shot event is represented by a data record containing the following information:

overall start time;

overall end time;

preemption priority of the associated mini-schedule;

the identity of the resource for which this event is scheduled; and, the identity of the single-shot event (event ID).

The qualifier "overall" has been added to the start and end dates and times of single-shot events to simplify the following discussion by using consistent terminology.

Each periodic recurring event is represented by a data record containing the following information:

overall start time;

overall end time;

a time pattern for occurrences of the event within the overall period;

the length of the pattern's period;

the start time of the pattern instance that is in progress at the time of the overall start time of the event;

a list of one or more pairs of start dates and times and end dates and times within the pattern;

preemption priority of the associated mini-schedule;

the identity of the resource for which this event is scheduled; and, the identity of the recurring event (event ID).

Within the two types of data record, event IDs serve as a reference to more detailed information about the event.

This invention compiles lists of events that can occur within time periods in time period data records ("TPDRs"). Each TPDR corresponds to a specific time period and contains the following information:

start time of the time period;

end time of the time period; and, a list of the identities of one or more event data records for events that can occur within the time period.

An event data record can only be referenced in a TPDR if the event data record's overall start time is earlier or the same as the TPDR's start time. Similarly, an event data record can only be referenced in a TPDR if the event data record's overall end time is later or the same as the TPDR's end time. Those individuals skilled in the art will appreciate that other data record formats can be defined without changing the essential nature of the invention.

Figure 4:
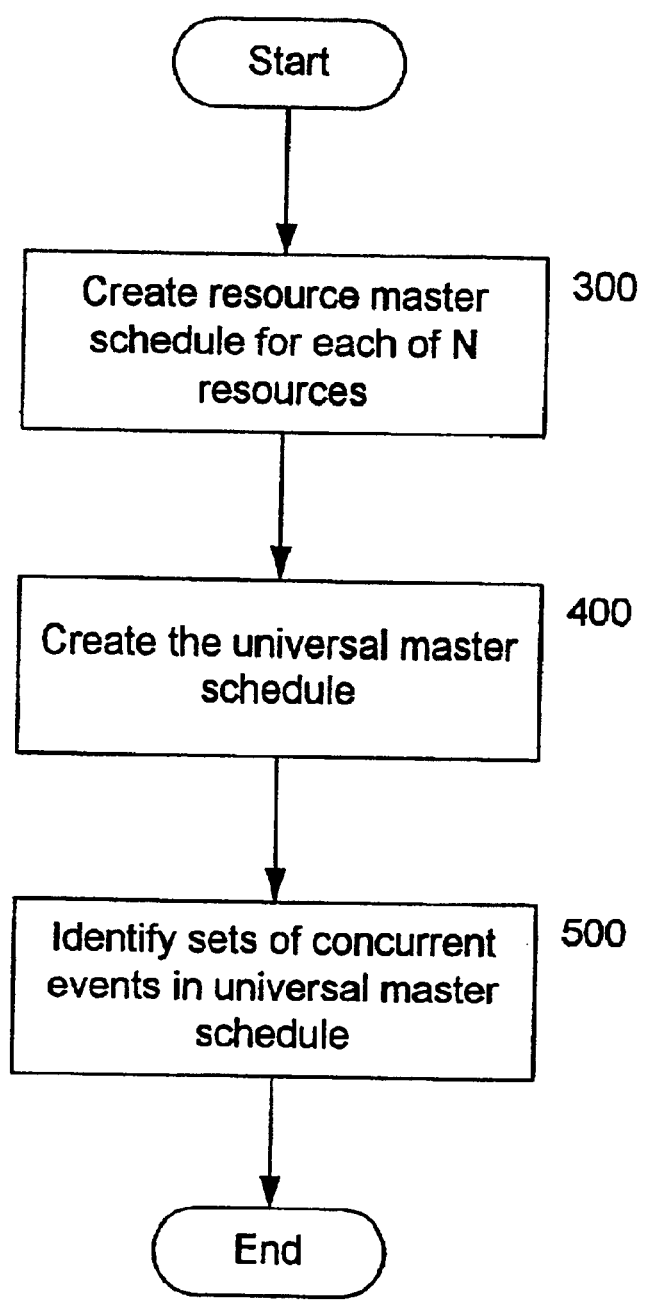
FIG. 4 is a flow chart illustrating a method according to the invention.

As shown in FIG. 4, a method 100 according to the invention starts by taking all mini-schedules associated with each of N resources and collapsing those mini-schedules into a master schedule for each resource (sub-method 300). The method continues by collapsing the N resource master schedules into a single universal master schedule (sub-method 400). The method concludes by iterating through each time period in the universal master schedule to identify sets of concurrent events (sub-method 500).

In sub-method 300, if a resource has only a single schedule, that schedule is treated as if it is the only mini-schedule for that resource. A separate master schedule is created for each resource. The resulting resource master schedule comprises a sequence of TPDRs ordered by their start dates and times. The periods covered by the TPDRs do not overlap. Each TPDR references those event data records of events that can occur within the time period covered by the TPDR. An event data record may be referenced by a sub-sequence of one or more TPDRs. During sub-method 300, each event is transformed, if necessary, into an event data record of the appropriate type that is referenced by one or more TPDRs.

For each of N resources, a master schedule data structure is created to hold the resource's master schedule. The master schedule data structure can hold an sequence of TPDRs ordered by start time of the periods to which the TPDRs relate. The master schedule data structure should provide O(log N) or better performance for the insertion of TPDRs. On request, the master schedule data structure should return, with O(log N) performance or better, the TPDR whose time period contains a given time. The master schedule data structure should also support ordered iteration through the TPDRs in the data structure. The master schedule data structure may comprise, for example, a B-tree or a skip list.

For each of N resources, method 300 initially creates in the master schedule data structure a single TPDR whose start time is DOT and end time is EOT. The initial TPDR references no event records. For each of N resources, the mini-schedules corresponding to the resource are sorted by preemption priority. The sorted mini-schedules are then processed in order starting with the lowest priority and ending with the highest priority. The order in which mini-schedules of equal priority are processed does not matter.

The events in each mini-schedule are processed. The order of processing is not important. For each single-shot event, a single-shot event data record is created. For each recurring event, a recurring event data record is created. If a current event has no specified overall end time, it is assigned EOT as its overall end time. It is also allowable for an event to be assigned DOT as its overall start time.

Figure 5A:
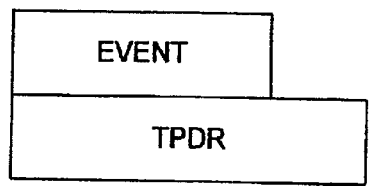
FIGS. 5A through 5F are diagrams illustrating six possible relationships between an event and a time period referred to by a time period data record (TPDR).

For each event, the master schedule data structure for the resource is accessed using the start time of the event to retrieve the TPDR whose period includes the event's overall start time (the current TPDR). The event's overall start time is compared to the current TPDR's start time. The event's overall end time is compared to the current TPDR's end time. One of six situations can occur as follows:

1. The event's overall start time is identical to the start time of the current TPDR and the event's overall end time is earlier than the end time of the current TPDR. In this case, as shown in FIG. 5A, the overall time period of the event corresponds to a leading part of the current TPDR's time period.

In this situation, two modified versions of the current TPDR are created and saved in the master schedule data record for the resource in place of the current TPDR. A first modified version of the TPDR differs from the current TPDR in that its end time is set to the overall end time of the event. A second modified version of the current TPDR differs from the original in that its start time is set to the overall end time of the event. In practice, this can be done by cloning (i.e. making a copy of) the current TPDR, modifying the current TPDR and the copy of the current TPDR to yield the first and second modified versions of the current TPDR and then saving the modified copy in the master schedule data structure. The first modified version of the TPDR is made to reference the event data record as described below.

Figure 5B:
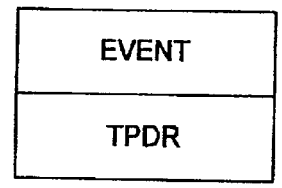

2. The event's overall start time is identical to the start time of the current TPDR and the event's overall end time is identical to the end time of the current TPDR. In this case, as shown in FIG. 5B, the overall time period of the event corresponds exactly with the time period of the current TPDR.

In this case the current TPDR is made to reference the event data record as described below.

Figure 5C:
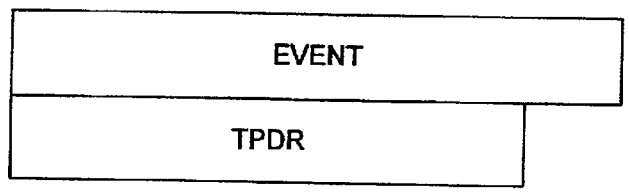

3. The event's overall start time is identical to the start time of the current TPDR and the event's overall end time is later than the end time of the current TPDR. In this case, as shown in FIG. 5C, the time period of the current TPDR corresponds to a leading edge of the event's overall time period.

In this situation, the current TPDR is made to reference the event data record, as described below.

Figure 5D:
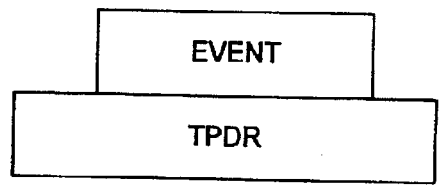

4. The event's overall start time is later than the start time of the current TPDR and the event's overall end time is earlier than the end time of the current TPDR. In this case, as shown in FIG. 5D, the overall time period of the event is embedded in the middle of the current TPDR's time period.

In this situation, the current TPDR is replaced with three modified versions of the current TPDR. A first modified version of the TPDR differs from the current TPDR in that the end time is set to the overall start time of the event. A second modified version of the TPDR differs from the current TPDR in that the start time is set to the overall start time of the event and the end time is set to the overall end time of the event. A third modified version of the TPDR differs from the current TPDR in that the start time is set to the overall end time of the event. This may be achieved, for example, by cloning the current TPDR twice, changing each of the original and the two cloned copies to create the first, second and third modified versions of the TPDR. The two modified clone copies of the TPDR are then inserted into the resource master schedule data structure. The second modified version of the TPDR is made to reference the event data record as described below.

Figure 5E:
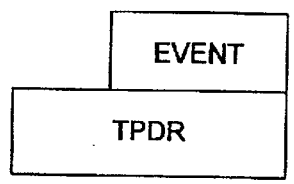

5. The event's overall start time is later than the start time of the current TPDR and the event's overall end time is identical to the end time of the current TPDR. In this case, as shown in FIG. 5E, the overall time period of the event corresponds to the trailing edge of the time period of the current TPDR.

In this situation, the current TPDR is replaced with two modified versions of the current TPDR. The first modified version differs from the current TPDR in that its end time is set to the overall start time of the event. The second modified version of the TPDR differs from the current TPDR in that its start time is set to the overall start time of the event. This may be implemented, for example, by cloning the current TPDR, modifying the current TPDR and the cloned copy of the TPDR to yield the first and second modified versions of the current TPDR and then inserting the modified clone copy of the current TPDR is inserted into the resource's master schedule data structure. The second modified version of the current TPDR is made to reference the event data record as described below.

Figure 5F:
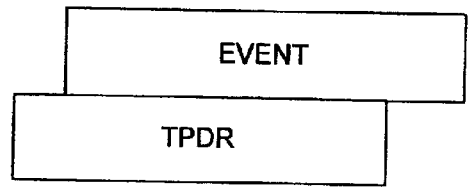

6. The event's overall start time is later than the TPDR's start time and the event's overall end time is later than the TPDR's end time. In this case, as shown in FIG. 5F, the overall time period of the event partially overlaps the trailing edge of the time period of the current TPDR.

In this situation, the current TPDR is replaced with first and second modified versions of the current TPDR. The first modified version of the current TPDR differs from the current TPDR in that its end time is set to the overall start time of the event. The second modified version of the original TPDR differs from the current TPDR in that its start time is set to the overall start time of the event. This may be implemented, for example, by making a clone of the current TPDR, modifying bothe the current TPDR and the clone to yield the first and second modified versions of the current TPDR and then inserting the clone copy of the TPDR into the resource's master schedule data structure. The second modified version of the current TPDR is made to reference the event data record as described below.

In all six situations, each time an event is processed, a TPDR is modified to include a reference to the event. The reference may be, for example, a pointer to the event's data record. If the event is a single-shot event, the reference to its single-shot event data record can replace any other references to event data records in the TPDR. This indicates that a single-shot event preempts any other lower priority event (s) that would otherwise have been scheduled to occur during the time period covered by the TPDR. An error is declared if the single-shot event has the same priority as any other events referenced by the TPDR.

If the event being processed is a recurring event, the reference to its recurring event data record is added to the list of references to event data records in the TPDR. An error is declared if the recurring event has the same priority as any single-shot events referenced by the TPDR. Where a TPDR includes references to more than one event, all of the referenced events could possibly occur in the time period covered by the TPDR.

It should be noted that where a TPDR references an event, the event might not actually occur in the time period covered by the TPDR. The time period covered by the TPDR may be too short for a recurring event to actually occur given that the recurring event's period may be quite long and the duration that the event is actually in progress may be short. A low priority single-shot event may never get a chance to occur, because of higher priority recurring events which preempt it.

In situations 3 and 6 above, the overall time period of the event extends to an overall end time and date which is later than the end time and date of the TPDR. In each of these cases the event overlaps into at least one following TPDR and possibly additional TPDRs. When an event is added to a TPDR, the event is also added to each successively following TPDR in the resource master schedule data structure up to and including the TPDR whose time period includes the overall end time of the event. In the following description, each of the successive TPDRs that are being processed is referred to as an overlapping TPDR, because the time period of the event being processed overlaps with the TPDR.

If the event's overall end time is later than or equal to the end time of the overlapping TPDR, the event completely overlaps the time period covered by the overlapping TPDR. In this case sub-method 300 modifies the overlapping TPDR to include a reference to the event data record. If the event is a single-shot event, the reference to its single-shot event data record replaces any other references to event data records in the overlapping TPDR. If the event is a recurring event, the reference to its recurring event data record is added to the list of references to event data records in the overlapping TPDR. Errors are declared for events of equal priority as described above.

If the event's overall end time is earlier than the end time of the overlapping TPDR, the event partially overlaps the time period covered by the overlapping TPDR. In this case the overlapping TPDR is replaced with first and second modified versions of the overlapping TPDR. The first modified version of the overlapping TPDR differs from the overlapping TPDR in that its end time is set to the overall end time of the event. The second modified version of the overlapping TPDR differs from the overlapping TPDR in that its start time is set to the overall end time of the event. This may be implemented by making a clone of the overlapping TPDR, modifying the clone and the overlapping TPDR to yield the first and second modified versions of the overlapping TPDR and then inserting the modified clone copy into the resource's master schedule data structure.

The first modified version of the overlapping TPDR is made to include a reference to the event data record. If the event is a single-shot event, the reference to its single-shot event data record replaces any other references to event data records in the first modified version of the overlapping TPDR. If the event is a recurring event, the reference to its recurring event data record is added to the list of references to event data records in the first modified version of the overlapping TPDR. Errors are declared for events of equal priority as described above.

Sub-method 300 processes events from mini-schedules of increasingly higher priority until all of the mini-schedules for a given resource have been processed. The resulting resource master schedule data structure contains one or more TPDRs, each of which references zero or more event data records. A TPDR references zero event data records, if there is no event whose overall time period includes the time period covered by the TPDR. With the possible exceptions of the start time of the first TPDR and the end time of the last TPDR in the resource master schedule data structure, the start and end dates and times of all TPDRs coincide with the start or end dates and times of events. The corollary is that for each event's overall start time, there is a TPDR with that time as its end time followed immediately by another TPDR with that time as its start time. Similarly, for the end time of each event (other than events having end times of EOT), there will be a TPDR with that time as its end time followed immediately by another TPDR with that time as its start time. For any event referenced by a TPDR, the time period covered by the TPDR will be identical to or a sub-period of the event's overall time period. Processing of resources continues until a resource master schedule has been constructed for each resource.

Software instructions which cause a date processor to perform sub-method 300, together with the date processor on which they are run may be called a means for collapsing a plurality of mini-schedules into a master schedule. The software instructions themselves may be termed software means for collapsing a plurality of mini-schedules into a master schedule.

The method of the invention proceeds by collapsing the N resource master schedules into a single universal master schedule (sub-method 400 in FIG. 4). In sub-method 400 a first one of the N resource master schedule data structures is preferably re-designated as the single universal master schedule data structure. Each of the remaining N−1 resource master schedule data structures is then iteratively collapsed into the universal master schedule data structure. The order in which the remaining N−1 resource master schedule data structures is collapsed into the universal master schedule data structure does not matter.

Each one of the remaining N−1 master schedule data structures is processed by taking each of its TPDRs, in order. The current TPDR can be designated as "TPDR A". Each TPDR A is collapsed into the universal master schedule data structure as follows. The universal master schedule data structure is accessed in order to retrieve the TPDR whose time period includes the start time of TPDR A. This TPDR may be called "TPDR B". The start time of TPDR A is compared to the start time of TPDR B. The end time of TPDR A is compared to the end time of TPDR B. Once again, one of six situations can occur as follows:

7. The start time of TPDR A is identical to the start time of TPDR B and the end time of TPDR A is earlier than the end time of TPDR B.

In this situation, TPDR B is replaced with first and second altered TPDRs. The first altered TPDR differs from TPDR B in that its end time is set to the end time of TPDR A. The second altered TPDR differs from TPDR B in that its start time is set to the end time of TPDR A. This may be accomplished, for example, by cloning TPDR B, altering the original and cloned copies of TPDR B to yield the first and second altered TPDRS and then saving the cloned TPDR B in the universal master schedule data structure. The first altered TPDR is modified as described below to include references to the event data records in TPDR A.

8. The start time of TPDR A is identical to the start time of TPDR B and the end time of TPDR A is identical to the end time of TPDR B. In this case the time period of TPDR A corresponds perfectly with the time period of TPDR B.

In this situation, TPDR B is modified as described below to include references to the event data records in TPDR A.

9. The start time of TPDR A is identical to the start time of TPDR B and the end time of TPDR A is later than the end time of TPDR B.

In this situation, TPDR B is modified as described below to include references to the event data records in TPDR A.

10. The start time of TPDR A is later than the start time of TPDR B and the end time of TPDR A is earlier than the end time of TPDR B.

In this situation, TPDR B is replaced with first, second and third altered TPDRs. The first altered TPDR differs from TPDR B in that its end time is set to the start time of TPDR A. The second altered TPDR differs from TPDR B in that its start time is set to the start time of TPDR A and its end time is set to the end time of TPDR A. The third altered TPDR differs from TPDR B in that its start time is set to the end time of TPDR A. This may be implemented, for example, by creating two clone copies of TPDR B, modifying the original and cloned copies of TPDR B to yield the first second and third altered TPDRs and inserting the two modified clone copies into the universal master schedule data structure. The second altered TPDR is modified as described below to include references to the event data records in TPDR A.

11. The start time of TPDR A is later than the start time of TPDR B and the end time of TPDR A is identical to the end time of TPDR B.

In this situation, TPDR B is replaced by first and second altered versions of TPDR B. The first altered version of TPDR B differs from TPDR B in that its end time is set to the start time of TPDR A. The second altered version of TPDR B differs from TPDR B in that its start time is set to the start time of TPDR A. This may be implemented, for example, by creating a clone copy of TPDR B, modifying the original and clone copies of TPDR B to yield the first and second altered TPDRs and inserting the modified clone copy into the universal master schedule data structure. The second altered TPDR is modified as described below to include references to the event data records in TPDR A.

12. The start time of TPDR A is later than the start time of TPDR B and the end time of TPDR A is later than the end time of TPDR B.

In this situation, TPDR B is replaced by first and second altered versions of TPDR B. The first altered version of TPDR B differs from TPDR B in that its end time is set to the start time of TPDR A. The second altered version of TPDR B differs from TPDR B in that its start time is set to the start time of TPDR A. This may be implemented, for example, by creating a clone copy of TPDR B, modifying the original and clone copies of TPDR B to yield the first and second altered TPDRs and inserting the modified clone copy into the universal master schedule data structure. The second altered TPDR is modified as described below to include references to the event data records in TPDR A.

In all six situations, TPDR B or an altered TPDR which replaces TPDR B is modified by adding to any references to events in TPDR B references to each of the events referenced in TPDR A. References from TPDR A do not replace any references already present in TPDR B. The universal master schedule aggregates the events of N resources. The events for any resource may occur simultaneously with events for other resources.

In situations 9 and 12 above, the overall time period of TPDR A extends into the time period of at least one TPDR following TPDR B and possibly into the time periods of additional TPDRs. For each TPDR A, the successively following TPDRs in the universal master schedule data structure are iteratively processed up to and including the TPDR whose time period includes the end time of TPDR A. In the following description, each of the successive TPDRs that are being processed is referred to as an overlapping TPDR, because its time period overlaps that of TPDR A.

If the end time of TPDR A is later than or equal to the end time of the overlapping TPDR, TPDR A completely overlaps the time period covered by the overlapping TPDR. In this case sub-method 400 modifies the overlapping TPDR by adding references to the event data records in TPDR A. If the end time of TPDR A is earlier than the end time of the overlapping TPDR, TPDR A partially overlaps the time period covered by the overlapping TPDR. In this case, the overlapping TPDR is replaced with first and second altered overlapping TPDRs. The first altered overlapping TPDR differs from the overlapping TPDR in that its end time is set to the end time of TPDR A. The second altered overlapping TPDR differs from the overlapping TPDR in that its start time is set to the end time of TPDR A. This may be implemented by cloning the overlapping TPDR, modifying the original and cloned overlapping TPDRs to yield the first and second altered overlapping TPDRs and then inserting the modified cloned overlapping TPDR into universal master schedule data structure. Sub-method 400 modifies the first altered overlapping TPDR by adding references to the event data records in TPDR A.

At this point, TPDR A can be discarded.

Sub-method 400 continues until all of the TPDRs in the remaining N−1 resource master schedule data structures have been processed. The resulting universal master schedule data structure contains one or more TPDRs, each of which references zero or more event data records. The characteristics of the universal master schedule data structure are identical to those of the individual resource master schedule data structures.

The start time and end time of all TPDRs in the universal master schedule data structure account for all of the overall start time and overall end time of all events scheduled on all resources. The list of referenced event data records in each TPDR enumerates all of the events that could possibly occur on all of the resources between the start time and the end time of the time period covered by the TPDR.

Software instructions which cause a data processor to perform sub-method 400 together with the data processor which the instructions are run may be termed a means for collapsing a plurality of resource master schedules into a universal master schedule. The software itself may be termed software means for collapsing a plurality of resource master schedules into a universal master schedule.

In a variation of the method of the invention, a universal master schedule is created without performing the preliminary step of creating N resource master schedule data structures. The alternate method would require a more sophisticated means than a list to track references to event data records in TPDRs.

The method of the invention proceeds to identify all of the unique sets of concurrent events that need to be validated (sub-method 500 in FIG. 4). All of the TPDRs in the universal master schedule data structure are processed to identify sets of concurrent events. The order in which TPDRs is processed does not matter.

The set of concurrent events that is in progress at a specified time may be represented as a bit vector. The bit vector is made at least large enough to assign one bit to each existing event. The bit corresponding to an event is set to 1 if the event is in progress at the specified time. The bit corresponding to an event is reset to 0 if the event is not in progress at the specified time.

In preferred embodiments of the invention, each event is assigned a unique integer event ID whose value numbers upwards from either 0 or 1 depending on the implementation technology being used. Event IDs are preferably reclaimed when events are destroyed and reassigned to new events in order to keep the set of assigned event IDs compact. The value of the event ID is used to determine the bit position within the bit vector that is assigned to the event. The bit vector described above need only be large enough to hold the largest assigned event ID.

In order to generate the minimum number of sets of concurrent events to be validated, a data structure is established to hold an ordered sequence of concurrent event bit vectors. Ordering is, for example, by the binary value of the bit vector. The data structure is initially empty. The data structure should provide O(log N) performance or better for the insertion of bit vectors. If an attempt is made to store a new bit vector into the data structure that is a duplicate of an existing bit vector in the data structure, the new bit vector is not stored in the data structure. Examples of an appropriate data structure include a B-tree or skip list. This data structure may be called a bit vector repository.

As each TPDR in the universal master schedule data structure is processed, its list of event data record references is examined to identify sets of concurrent events. If a TPDR's list of event data record references only includes references to single-shot events then the only set of concurrent events for that TPDR is the set of events referenced by the event data record references. A concurrent event bit vector is created having bits set to 1 that correspond to the listed events. The bit vector is added to the bit vector repository.

If a TPDR's list of event data record references includes any references to recurring events then there may be multiple sets of concurrent events for that TPDR. The sets of concurrent events will depend on which recurring events (and lower priority single-shot events) actually occur during the period of time covered by the TPDR.

In this situation brute force, time-based iteration could be used to identify all of the sets of concurrent events. Bit vectors can be created for the sets of concurrent events and added to the bit-vector repository. It is desirable, however, to identify efficiently all sets of concurrent events, especially for TPDRs which cover long periods of time. Further, it is necessary to handle the last TPDR in the universal master schedule data structure. The last TPDR has an end time of EOT (i.e. unspecified).

To prevent an infinite loop of time-based iteration a time limit is established to limit the iteration. All recurring events recur on some periodic basis. Different recurring events may have different time periods. The time limit is the lesser of the time period associated with the TPDR or the least common multiple of all the periods of recurring events referenced by the TPDR. The resulting time limit is added to the start time of the TPDR to derive the stop time for the time-based iteration.

For example, if a TPDR references three recurring events with periods of 1.5, 2, and 3 weeks, the least common multiple of their periods is 6 weeks. If the time period of a TPDR referencing these events is 10 weeks, a 6 week period would be used.

Time-based iteration proceeds by establishing a reference time. The reference time is initially the start time of the TPDR. An initial set of concurrent events is determined by examining the event data records referenced by the TPDR to determine which events are in progress on the N resources at the start time of the TPDR. A bit vector is created representing the set of concurrent events that are in progress at the start time of the TPDR. The bit vector is added to the bit vector repository.

A current bit vector reference is established which points to the bit vector representing the set of concurrent events that are in progress at the reference time. The current bit vector reference is initially set to point to the bit vector representing the set of concurrent events that are in progress at the start time of the TPDR. Time-based iteration iteratively proceeds to identify additional sets of concurrent events. At the start of each iteration, the recurring event data records referenced by the TPDR are examined to identify the nearest time following the reference time where any referenced event either starts or stops. An easiest way to do this is to identify the next significant time following the reference time for each event referenced by the TPDR. The resulting dates and times are then sorted to find the closest time following the reference time.

The event data records, for which the selected time is significant, are examined. There may be multiple event data records, because multiple events may be scheduled to stop or start at the same time. The event data records for events that are scheduled to stop at the selected time shall hereafter be referred to as the current event data records and their events as the current events. The event data records for events that are scheduled to start at the selected time shall hereafter be referred to as the next event data records and their events as the next events.

Each current event that is scheduled to stop may or may not correspond to the event that has been in progress for the corresponding resource. The current event may be a lower priority event that has been previously preempted by a higher priority event. The current event may be scheduled to stop while the preempting event is in progress. Similarly, each next event that is scheduled to start may or may not actually be starting for the corresponding resource. The next event may be a lower priority event that has been previously preempted by a higher priority event.

If a current event is the highest priority event for its resource, a transition may be underway to an event that is not a next event, because the event does not have a significant time corresponding to the selected time. A transition may be underway to an event that was previously preempted. Similarly, if a next event is the highest priority event for its resource, a transition may be underway from an event that is not a current event. The next event may be preempting the in progress event.

The current and next data records and the other event data records associated with the same resources as the current and next data records are examined to identify which in progress events are stopping and which other events are starting to be in progress at the significant time. A bit vector which represents the concurrent events immediately after the selected time is then created. This bit vector may, for example, be created by cloning the bit vector referenced by the current bit vector reference, resetting to 0 any bits in the cloned copy of the bit vector which correspond to in progress events that will stop at the selected time, and setting to 1 bits in the cloned copy of the bit vector which correspond to any events that will start to be in progress at the selected time. The modified cloned copy of the bit vector is inserted into the bit vector repository. The current bit vector reference is set to point to the modified cloned copy of the bit vector. The reference time is advanced to the selected time.

At this point an iteration of the time-based iteration is complete. Further iterations are performed for the same TPDR until the reference time points to a time that is equal to or greater than the time limit calculated earlier.

Upon completion of time-based iteration, processing of the TPDR has been completed. Processing of additional TPDRs in the universal master schedule data structure continues until all TPDRs have been processed. Software instructions cause a data processor to perform sub-method 500, taken together with the data processor may be termed a means for extracting a plurality of sets of concurrent events. The software instructions alone may be termed software means for extracting a plurality of sets of concurrent events.

Once all of the TPDRs in the universal master schedule data structure have been processed, the method of the invention is complete. The bit vector repository holds a minimum unique set of bit vectors representing sets of concurrent events that must be validated. These bit vectors may be passed to a validation system which can check to determine whether the concurrent events exhibit incompatibilities.

Preferred implementations of the invention include a computer system programmed to execute a method of the invention. The computer systems includes a data processor which may comprise a plurality of processors of any suitable type(s). The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links. The computer-readable signals preferably comprise software means for collapsing a plurality of mini-schedules into a master schedule; software means for collapsing a plurality of master schedules into a universal master schedule and software means for extracting a plurality of sets of concurrent events. Specific embodiments of the invention may comprise a computer connected to receive QoS schedules from a plurality of packet handling devices, the computer programmed to perform the methods of the invention to identify sets of concurrent events in the QoS policies and to pass those sets of concurrent events as a data record, preferably a bit vector repository to a validation system.

What is claimed is:

1. A computer implemented method for enumerating sets of concurrently scheduled events for automatic validation, the method comprising, in a programmed computer system:
   a) providing a universal master schedule comprising a plurality of time period data records (TPDRs) each having a start time and an end time, at least some of the TPDRs comprising references to events, each event having an overall start time and an overall end time, the events including recurring events each having a period;
   b) retrieving a TPDR from the universal master schedule;
   c) establishing a time limit for the TPDR;
   d) performing a time-based iteration to identify sets of concurrent events by:
      1) establishing the start time of the TPDR as a selected time;
      2) identifying a set of zero or more events occurring at the selected time;
      3) creating a record of the set of zero or more events occurring at the selected time;
      4) identifying a new selected time corresponding to a next time when an event referenced by the TPDR could start or stop; and,
      5) repeating actions (2) to (4) until the new selected time is in excess of the time limit; and,
   e) performing actions (b) through (d) for each TPDR in the universal master schedule.

2. The method of claim 1 wherein the time limit is a lesser one of a least common multiple of the periods of any recurring events reference by the TPDR and a length of the TPDR.

3. The method of claim 1 wherein the events comprise single-shot events and the method comprises determining whether all events associated with a TPDR are single-shot events and, if so, recording the set of single-shot events associated with the TPDR as a set of concurrent events for validation.

4. The method of claim 1 wherein providing the universal master schedule comprises:
   a) providing a plurality of master schedule data structures, each master schedule data structure corresponding to a resource and comprising one or more TPDRs each associated with a time period;
   b) collapsing the plurality of master schedule data structures into the universal master schedule data structure by:

1) providing an initial universal master schedule data structure comprising at least one TPDR;
2) selecting one of the TPDRs from one of the master schedule data structures as a current TPDR;
3) if necessary, modifying the universal master schedule data structure so that the start time of the current TPDR corresponds to the end time of one TPDR of the universal master schedule data structure and the start time of another TPDR of the universal master schedule data structure and the end time of the current TPDR corresponds to the end time of one TPDR of the universal master schedule data structure and the start time of another TPDR of the universal master schedule data structure;
4) in the universal master schedule data structure, associating each TPDR which has a start time greater or equal to the start time of the current TPDR and a finish time less than or equal to the finish time of the current TPDR with the events referenced by the current TPDR; and,
5) repeating actions (2) through (4) for the remaining TPDRs of the master schedule data structures.

5. The method of claim 4 wherein modifying the universal master schedule data structure comprises, in either order:
locating a TPDR in the universal master schedule data structure for which the associated time period includes the start time of the current TPDR and, if the start time of the current TPDR is after the start time of the located TPDR, replacing the located TPDR in the universal master data structure with first and second altered TPDRs which differ from the located TPDR in that the end time of the first altered TPDR and the start time of the second altered TPDR are set to the start time of the current TPDR; and, locating a TPDR in the universal master schedule data structure for which the associated time period includes the end time of the current TPDR and, if the end time of the current TPDR is after the start time of the located TPDR, replacing the located TPDR in the universal master data structure with first and second altered TPDRs which differ from the located TPDR in that the end time of the first altered TPDR and the start time of the second altered TPDR are set to the end time of the current TPDR.

6. The method of claim 4 wherein the initial universal master schedule data structure comprises a selected one of the master schedule data structures.

7. The method of claim 4 wherein providing one or more of the master schedules comprises:
a) providing a plurality of mini-schedule data structures, each mini-schedule data structure having a priority, corresponding to a resource and comprising one or more TPDRs each associated with a time period;
b) collapsing the plurality of mini-schedule data structures into the master schedule data structure by:
1) providing an initial master schedule data structure comprising at least one TPDR and selecting a lowest priority one of the mini-schedules as a current mini-schedule;
2) selecting one of the TPDRs from the current mini-schedule as a current TPDR;
3) if necessary, modifying the master schedule data structure so that the start time of the current TPDR corresponds to the end time of one TPDR of the universal master schedule data structure and the start time of another TPDR of the universal master schedule data structure—and the end time of the current TPDR corresponds to the end time of one TPDR of the universal master schedule data structure and the start time of another TPDR of the universal master schedule data structure;
4) in the master schedule data structure, associating each TPDR which has a start time greater or equal to the start time of the current TPDR and a finish time less than or equal to the finish time of the current TPDR with the events referenced by the current TPDR;
5) repeating actions (2) through (4) for the remaining TPDRs of the current mini-schedule; and,
6) repeating actions (2) through (5) for each of the mini-schedules in priority order.

8. The method of claim 7 wherein modifying the master schedule data structure comprises in either order:
locating a TPDR in the master schedule data structure for which the associated time period includes the start time of the current TPDR and, if the start time of the current TPDR is after the start time of the located TPDR, replacing the located TPDR in the master data structure with first and second altered TPDRs which differ from the located TPDR in that the end time of the first altered TPDR and the start time of the second altered TPDR are set to the start time of the current TPDR; and,
locating a TPDR in the master schedule data structure for which the associated time period includes the end time of the current TPDR and, if the end time of the current TPDR is after the start time of the located TPDR, replacing the located TPDR in the master data structure with first and second altered TPDRs which differ from the located TPDR in that the end time of the first altered TPDR and the start time of the second altered TPDR are set to the end time of the current TPDR.

9. The method of claim 7 wherein, in collapsing the plurality of mini-schedules, associating a TPDR with the events referenced by the current TPDR comprises, if the current TPDR is associated with a single-shot event, replacing any references to events referenced by the TPDR with a reference to the single-shot event.

10. The method of claim 9 wherein, in collapsing the plurality of mini-schedules, associating a TPDR with the events referenced by the current TPDR comprises, if the current TPDR is associated with one or more recurring events, adding references to the one or more recurring events to the TPDR.

11. The method of claim 1 wherein creating a record of the set of zero or more events comprises providing a bit vector having one bit for each of a number of possible events and setting a bit in the bit vector corresponding to each of the zero or more events.

12. The method of claim 11 wherein creating a record of the set of zero or more events comprises checking a bit vector repository to determine if the bit vector is the same as any bit vector already stored in the bit vector repository and, if not, storing the bit vector in the bit vector repository.

13. The method of claim 1 wherein the events each comprise enabling a specific QoS policy on a data communication network.

14. The method of claim 1 wherein the universal master schedule data structure comprises a B-tree.

15. The method of claim 1 wherein the universal master schedule data structure comprises a skip list.

16. Apparatus for enumerating sets of concurrently scheduled events, the apparatus comprising:
a) a first means for collapsing a plurality of mini-schedules into a master schedule;
b) a second means for collapsing a plurality of master schedules into a universal master schedule, the second means connected to receive a plurality of master schedules generated by the first means; and, c) a third means for extracting a plurality of sets of concurrent events, the third means connected to receive a universal master schedule from the second means and to store a data record containing information identifying sets of concurrent events scheduled in the universal master schedule, wherein the third means comprises means for performing a time-based iteration comprising,
   a) means for establishing a start time of a time period data record (TPDR) as a selected time;
   b) means for identifying a set of zero or more events occuring at the selected time;
   c) means for creating a record of the set of zero or more events occuring at the selected time;
   d) means for identifying a new selected time corresponding to a next time when an event referenced by the TPDR could start or stop; and,
   e) means for repeating actions (b) to (d) until the new selected time is in excess of a time limit of the TPDR.

17. The apparatus of claim 16 comprising means for determining whether all events in a set of concurrent events are single-shot.

18. A computer readable medium containing instructions which, when executed by a processor, cause the processor to perform operations comprising:
   a) providing a universal master schedule comprising a plurality of time period data records (TPDRs) each having a start time and an end time, at least some of the TPDRs comprising references to events, each event having an overall start time and an overall end time, the events including recurring events each having a period;
   b) retrieving a TPDR from the universal master schedule;
   c) establishing a time limit for the TPDR;
   c) performing a time-based iteration to identify sets of concurrent events by:
      1) establishing the start time of the TPDR as a selected time;
      2) identifying a set of zero or more events occurring at the selected time;
      3) creating a record of the set of zero or more events occurring at the selected time;
      4) identifying a new selected time corresponding to a next time when an event referenced by the TPDR could start or stop; and,
      5) repeating action (2) to (4) until the new selected time is in excess of the time limit; and,
   e) performing actions (b) through (d) for each TPDR in the universal master schedule.

19. The computer readable medium of claim 18 wherein the time limit is a lesser one of a least common multiple of the periods of any recurring events reference by the TPDR and a length of the TPDR.

20. The computer readable medium of claim 18 wherein the events comprise single-shot events and the method comprises determining whether all events associated with a TPDR are single-shot events and, if so, recording the set of single-shot events associated with the TPDR as a set of concurrent events for validation.

21. The computer readable medium of claim 18 wherein providing the universal master schedule comprises:
   a) providing a plurality of master schedule data structures, each master schedule data structure corresponding to a resource and comprising one or more TPDRs each associated with a time period;
   b) collapsing the plurality of master schedule data structures into the universal master schedule data structure by:
      1) providing an initial universal master schedule data structure comprising at least one TPDR;
      2) selecting one of the TPDRs from one of the master schedule data structures as a current TPDR;
      3) if necessary, modifying the universal master schedule data structure so that the start time of the current TPDR corresponds to the end time of one TPDR of the universal master schedule data structure and the start time of another TPDR of the universal master schedule data structure and the end time of the current TPDR corresponds to the end time of one TPDR of the universal master schedule data structure and the start time of another TPDR of the universal master schedule data structure;
      4) in the universal master schedule data structure, associating each TPDR which has a start time greater or equal to the start time of the current TPDR and a finish time less than or equal to the finish time of the current TPDR with the events referenced by the current TPDR; and,
      5) repeating actions (2) through (4) for the remaining TPDRs of the master schedule data structures.

22. The computer readable medium of claim 21 wherein modifying the universal master schedule data structure comprises, in either order:
   locating a TPDR in the universal master schedule data structure for which the associated time period includes the start time of the current TPDR and, if the start time of the current TPDR is after the start time of the located TPDR, replacing the located TPDR in the universal master data structure with first and second altered TPDRs which differ from the located TPDR in that the end time of the first altered TPDR and the start time of the second altered TPDR are set to the start time of the current TPDR, and, locating a TPDR in the universal master schedule data structure for which associated time period includes the end time of the current TPDR and, if the end time of the current TPDR is after the start time of the located TPDR, replacing the located TPDR in the universal master data structure with first and second altered TPDRs which differ from the located TPDR in that the end time of the first altered TPDR and the start time of the second altered TPDR are set to the end time of the current TPDR.

23. The computer readable medium of claim 18 wherein the events each comprise enabling a specific QoS policy on a data communication network.

* * * * *